US012106782B2

(12) United States Patent
Jiao et al.

(10) Patent No.: US 12,106,782 B2
(45) Date of Patent: Oct. 1, 2024

(54) EDITABLE READ-WRITE DATA MEMORY BASED ON MECHANICAL STRUCTURE

(71) Applicant: ZHEJIANG UNIVERSITY, Zhejiang (CN)

(72) Inventors: Pengcheng Jiao, Hangzhou (CN); Luqin Hong, Hangzhou (CN); Wentao Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/542,820

(22) Filed: Dec. 18, 2023

(65) Prior Publication Data

US 2024/0119972 A1 Apr. 11, 2024

Related U.S. Application Data

(63) Continuation of application No. PCT/CN2021/133830, filed on Nov. 29, 2021.

(30) Foreign Application Priority Data

Aug. 23, 2021 (CN) .......................... 202110967722.4

(51) Int. Cl.
*G11B 33/06* (2006.01)
*G11B 23/02* (2006.01)
*G11B 33/12* (2006.01)

(52) U.S. Cl.
CPC ............ *G11B 33/06* (2013.01); *G11B 23/021* (2013.01); *G11B 33/128* (2013.01)

(58) Field of Classification Search
CPC ..... G11B 33/06; G11B 23/021; G11B 33/128; G11B 3/008; G06F 1/187
See application file for complete search history.

(56) References Cited

U.S. PATENT DOCUMENTS 3,183,494 A 5/1965 Welsh
2004/0252553 A1 12/2004 Sharma
(Continued)

FOREIGN PATENT DOCUMENTS

CN 102937459 A 2/2013
CN 106605268 A 4/2017
(Continued)

OTHER PUBLICATIONS

International Search Report (PCT/CN2021/133830); Date of Mailing: May 9, 2022.
(Continued)

*Primary Examiner* — Andrew Sasinowski
(74) *Attorney, Agent, or Firm* — W&G Law Group

(57) ABSTRACT

Provided is an editable read-write data memory based on mechanical structure, including: a storage unit, a signal collection unit and a cantilever unit. The data memory is formed by arranging several storage units, and each of which includes a rotation unit and a variable-frequency unit. An N-pole magnet is provided on the rotation unit, and an S-pole probe is provided on the cantilever unit. When the external environment changes and drives the S-pole probe on the cantilever unit to approach the N-pole magnet on the rotating unit, the rotation unit rotates and drives the variable-frequency unit to buckle, and the change of buckling shape leads to a state change, so as to store data. The signal collection unit is connected with the variable-frequency unit, and the collected electrical signals are display. The stored information in the memory is read according to the change of the output electrical signals.

7 Claims, 2 Drawing Sheets

(56) References Cited

U.S. PATENT DOCUMENTS

| | | | |
|---|---|---|---|
| 2007/0274123 A1 | 11/2007 | Mohanty et al. | |
| 2013/0213778 A1 | 8/2013 | Davidson et al. | |
| 2014/0299737 A1* | 10/2014 | Okumura | H05K 7/1487 |
| | | | 248/636 |
| 2016/0276014 A1 | 9/2016 | Fox et al. | |
| 2017/0150621 A1* | 5/2017 | Breakstone | H05K 7/20736 |
| 2017/0364128 A1* | 12/2017 | Schroeder | G06F 1/20 |
| 2020/0260615 A1* | 8/2020 | Leigh | G06F 1/20 |

FOREIGN PATENT DOCUMENTS

| | | |
|---|---|---|
| CN | 107210264 A | 9/2017 |
| CN | 108766488 A | 11/2018 |
| CN | 108806726 A | 11/2018 |
| CN | 111551269 A | 8/2020 |
| CN | 111551271 A | 8/2020 |
| CN | 113672053 A | 11/2021 |
| JP | 2008288426 A | 11/2008 |

OTHER PUBLICATIONS

First Office Action(CN202110967722.4); Date of Mailing: Feb. 27, 2024.
Four-state-memory-based-on-magnetoelectric-composites.

\* cited by examiner

EDITABLE READ-WRITE DATA MEMORY BASED ON MECHANICAL STRUCTURE

CROSS-REFERENCE TO RELATED APPLICATIONS

The present application is a continuation of International Application No. PCT/CN2021/133830, filed on Nov. 29, 2021, which claims priority to Chinese Application No. 202110967722.4, filed on Aug. 23, 2021, the contents of both of which are incorporated herein by reference in their entireties.

TECHNICAL FIELD

The present disclosure relates to the technical field of data memory and in particular, to an editable read-write data memory based on mechanical structure.

BACKGROUND

A memory is a memory device of a computer hardware system for storing programs (software) and various data. A storage unit is actually a kind of sequential logic circuit. The memory is a collection of multiple storage units which are arranged according to the order of the unit numbers. Each unit is composed of a plurality of binary bits to represent the value stored in the storage unit. The memory stores and extracts information according to a location assigned by a controller. The memory endows the computer with memory function to ensure the normal operation of the computer. The memory in the computer may be classified as main memory (internal memory) and auxiliary memory (external memory) by use. At present, most general memories are composed of semiconductor devices. Traditional data memory still plays a significantly role in many important fields. As data memory has been more widely used in intelligent robots and bioengineering, the requirements for memory become stricter. Therefore, it is necessary to design a new memory that meets present requirements. The present disclosure provides an editable read-write data memory based on mechanical structure.

The development of mechanical metamaterials and buckling effect provides technical support for the present disclosure. In recent years, mechanical metamaterials have been proposed and studied as a new type of material. Mechanical metamaterials have excellent mechanical properties, such as negative mass, zero or negative Poisson's ratio, negative stiffness, compressibility and structural instability caused by buckling. When a plate is axially loaded or moved so that the motion of the plate is limited between two rigid constraints, the behavior of the plate is similar to the motion of a snake between two parallel walls, and the unique behavior is called postbuckling. The postbuckling of mechanical metamaterials and the plate provides a unique mechanical structure for the present disclosure.

In the present disclosure, considering that there is no new memory that meets the present requirements, an editable read-write data memory based on mechanical structure is provided, which may be applied for data storage of computers and other electronic devices. The problem to be solved by the present disclosure is that the data is stored through the unique characteristics of mechanical metamaterials and postbuckling phenomenon. The innovation of the present disclosure is that the device can store data through the mechanical structure and the structure is simple. The device relies on magnetic force for mode conversion, and collects and stores data in the form of electrical signals.

SUMMARY

In order to design a new memory that meets the present requirements, the present disclosure provides an editable read-write data memory based on mechanical structure.

The present disclosure is realized by the following technical solution: an editable read-write data memory based on mechanical structure, including a storage unit, a signal collection unit and a cantilever unit.

The data memory is formed by arranging a plurality of storage units, and each of the plurality of storage units includes a rotation unit and a variable-frequency unit. An N-pole magnet is provided at the rotation unit, and an S-pole probe is provided at the cantilever unit. When the S-pole probe at the cantilever unit approaches the N-pole magnet at the rotating unit driven by change of the external environment, the rotation unit rotates and drives the variable-frequency unit to buckle, and a change of buckling shape leads to a state change, so as to store data. The signal collection unit is connected to the variable-frequency unit to display the collected electrical signals. The stored information in the memory is read according to the change of the output electrical signals.

Further, the rotation unit is provided with two N-pole magnets at a left side and a right side, respectively, when contacting the magnet probe with the S-pole magnet probe at one end of the cantilever unit, the rotation unit rotates to make one end of the rotation unit tilt up.

Further, the variable-frequency unit includes a left side plate, a right side plate and a middle flexible plate. A conductive sheet copper is provided at the right side of the middle flexible plate. When the two N-pole magnets of the rotation unit contact the magnet S-pole probe, the variable-frequency unit buckles, and the middle flexible plate contact the right side plate instead of the left side plate.

Further, the state of the variable-frequency unit in contact with the left side plate is denoted as state "0", and the state of the variable-frequency unit in contact with the right side plate is denoted as state "1". The states "0" and "1" are not only two states of a single unit of the read-write memory, but also binary data that converts text, pictures, audio and other information into "0" and "1", thereby facilitating identifying and determining of a computer system.

Further, when the variable-frequency unit contacts the right side plate instead of the left side plate, the conductive sheet copper at the right side of the variable-frequency unit contacts the right side plate to generate electrical signals, and a wire transmits the electrical signals to the signal collection unit.

Further, the magnet probe rotates 360° by the cantilever unit so as to be capable of contacting each of the plurality of storage units in a certain layer.

Further, the cantilever unit slides up and down vertically by a guide rail so that the magnet probe is capable of contacting each of the plurality of storage units in different layers.

Further, the rotation unit rotates around a rotation shaft provided at the center of the rotation unit. The rotation shaft is fixed and penetrates through the rotation unit. The two N-pole magnets are symmetrically provided at both sides of the rotation shaft. When the S-pole probe contacts at least one of the N-pole magnets, the two N-pole magnets can rotate up and down through the rotation shaft.

Further, the storage unit may be expanded into a three-dimensional memory of n×n×n to obtain more storage information.

The beneficial effects of the present disclosure are as follows. The present disclosure provides an editable read-write data memory based on mechanical structure, which is capable of storing data through the mechanical structure. The data memory is capable of storing data through the unique characteristics of mechanical metamaterials and postbuckling phenomenon. The innovation of the present disclosure is that the device is capable of storing data through a mechanical structure and the structure is simple. The device relies on magnetic force for mode conversion, and collects and stores data in the form of electrical signals. The device is capable of being extended into a three-dimensional memory of n×n×n to store a large amount of data information.

Reference signs: rotation unit—1, magnet—2, base—3, variable—frequency unit—4, conductive sheet copper—5, wire—6, electrical signal collector—7, cantilever pedestal—8, guide rail—9, telescopic cantilever—10, magnet probe—11, editor bracket—12, rotation shaft—13.

DESCRIPTION OF EMBODIMENTS

The specific embodiments of the present disclosure are further described in detail below with reference to the drawings.

Figure 4:
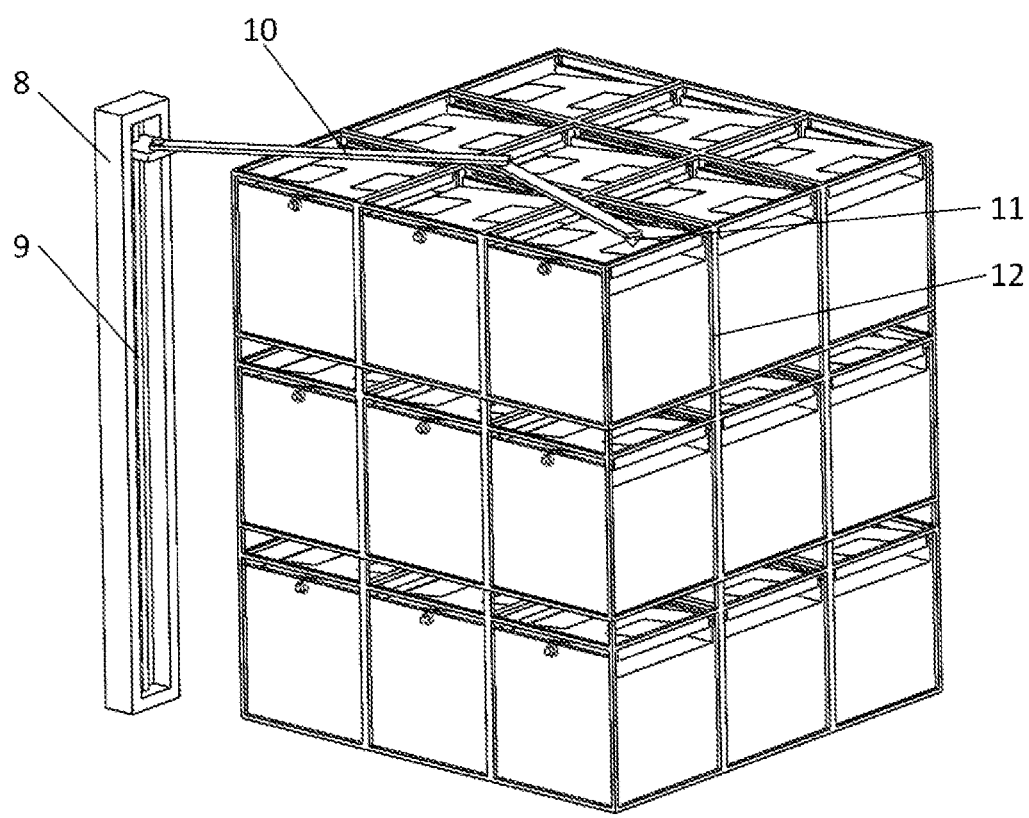
FIG. 4 is a structural schematic diagram of an overall data memory.

As shown in FIG. 4, an editable read-write data memory based on mechanical structure, including a storage unit, a variable-frequency unit 4, a signal collection unit 7 and a cantilever unit 10. The data memory can be used in the field of health monitoring for the sea-crossing bridge and other large engineering structures. Taking a sea-crossing bridge as an example, the editable read-write data memory based on mechanical structure is assembled at a platform and embedded into the target bridge structure. For bridge indicators such as wind-force and displacement, states "0" and "1" are set, so that an evaluation state of the bridge may be obtained in real time through the states "0" and "1". The storage unit may be expanded into a three-dimensional memory of n×n×n to obtain more storage information. The data memory is formed by arranging a plurality of storage units, and each storage unit includes a rotation unit 1 and a variable-frequency unit 4. When a S-pole probe 11 on the cantilever unit 10 approaches a N-pole magnet 2 ats an editor unit driven by the change of the external environment, the rotation unit rotates and drives the variable-frequency 4 unit to buckle, and a change of buckling shape leads to a state change, so as to store data. A signal collection unit 7 can display the collected electrical signals. The stored information in the editor is read according to the change of the output electrical signals. Two N-pole magnets 2 are provided at the left and right sides of the rotation unit 1, respectively, and when contacting the magnet S-pole probe 11, the rotation unit 1 can rotate and make one end of the rotation unit 1 tilt up.

Figure 1:
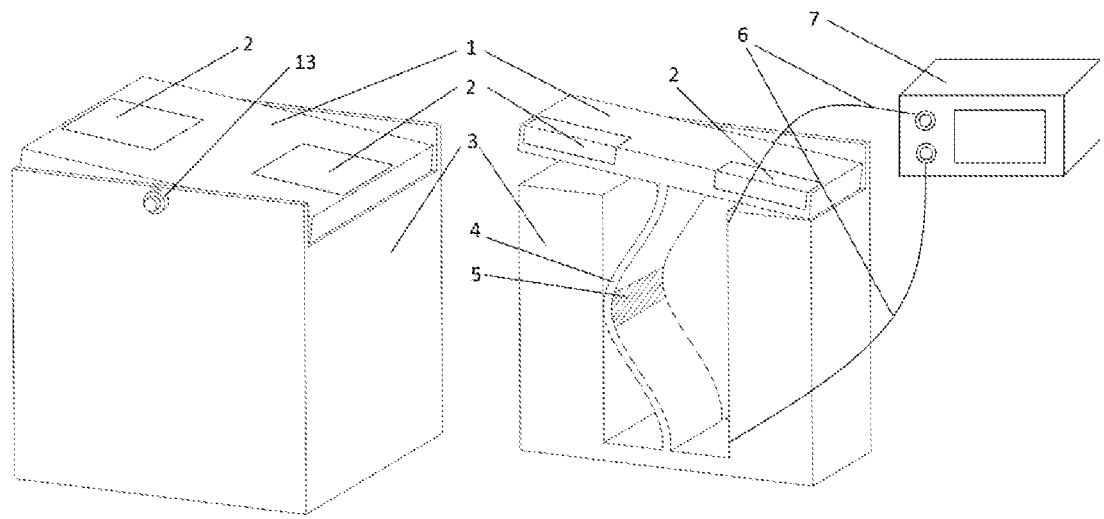
FIG. 1 is a schematic diagram of a data memory with state "0"
Figure 2:
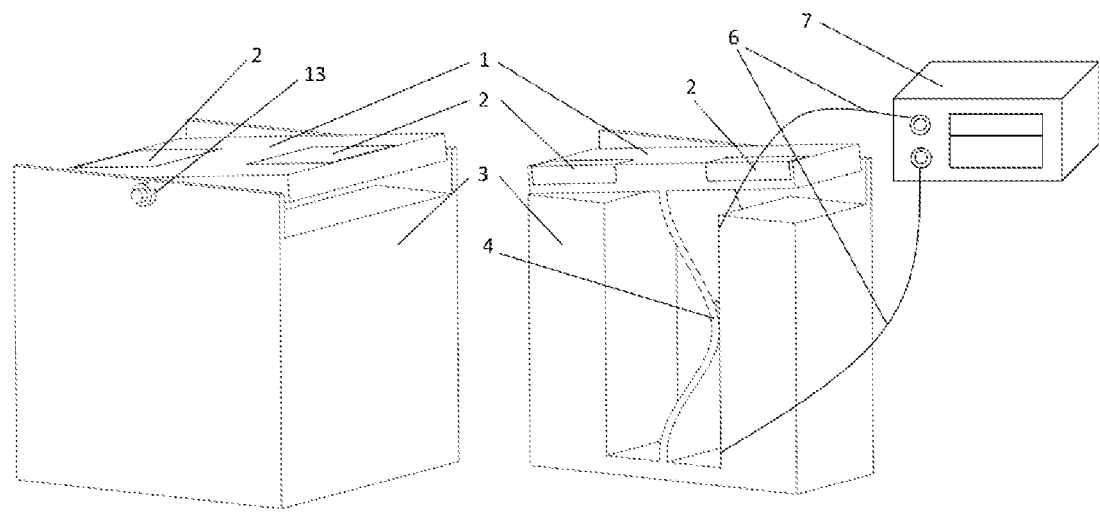
FIG. 2 is a schematic diagram of a data memory with state "1"
Figure 3:
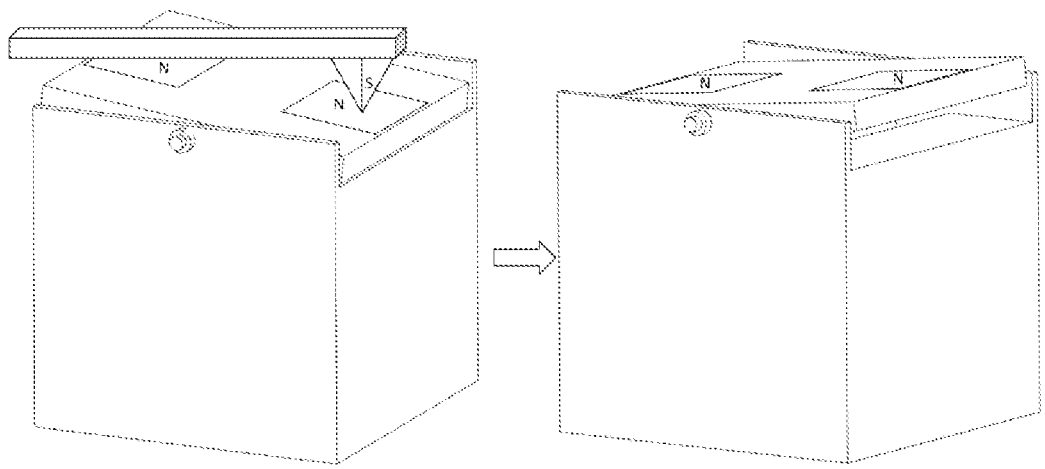
FIG. 3 is a schematic diagram of a data memory with state changing from "0" to "1"

When the two N-pole magnets 2 of the rotation unit 1 contact the magnet S-pole probe 11, the variable-frequency unit 4 buckles and the variable-frequency unit 4 contacts a right side plate instead of a left side plate. When the variable-frequency unit 4 contacts the right side plate instead of a left side plate, a conductive sheet copper 5 at the right side of the variable-frequency unit 4 contacts the right side plate to generate electrical signals. As shown in FIGS. 1, 2 and 3, the states "0" and "1" are not only two states of a single unit of the read-write memory, but also binary data that converts text, pictures, audio and other information into "0" and "1", thereby facilitating identifying and determining of a computer system. Each storage unit may form a "01" matrix. When the storage unit is expanded into a three-dimensional memory of n×n×n, the memory may obtain $2^{(n \times n \times n)}$ sets of deformation data, thereby collecting a large amount of data. When the conductive sheet copper 5 at the right side of the variable-frequency unit 4 contacts the right side plate to generate electrical signals, and an electrical signal collector 7 connected to the variable-frequency unit 4 through a wire 6 will display the electrical signals.

The magnet probe 11 may rotate 360° under the action of a telescopic cantilever 10 to ensure that the magnet probe 11 can contact each storage unit in a certain layer.

The telescopic cantilever 10 may slide up and down vertically under the action of a guide rail 9 to ensure that the magnet probe 11 can contact each storage unit in different layers.

The rotation unit 1 may rotate around a rotation shaft 13. The rotation shaft 13 is provided at the center of the rotation unit 1. The rotation shaft 13 is fixed, and penetrates through the rotation unit 1. Two N-pole magnets are symmetrically arranged at both sides of the rotation shaft 13. When the S-pole probe 11 contacts a N-pole magnet 2, the two N-pole magnets 2 may rotate up and down through the rotation shaft 13.

The present disclosure may be used in the field of health monitoring for the sea-crossing bridge and other large engineering structures. The editable read-write data memory based on mechanical structure is assembled at a platform and embedded into the structure of a target bridge. When the external loads such as wind-force change, the local structure changes, thus changing the state of the single storage unit. Therefore, local loads may be monitored and stored. A threshold value may be set according to the case that the structure is seriously deformed or close to the unstable state caused by the external loads. After exceeding the threshold value, a mechanical response of the cantilever may change the state of the memory. When multiple parts of the structure are deformed, up to $2^{(n \times n \times n)}$ sets of deformation data may be generated for monitoring and storage. Monitoring results are then transmitted to a central integrated computing platform through wireless signals, and may be read and analyzed by a front-end device for real-time monitoring and early warning.

Finally, it should be noted that the above embodiments are only used to illustrate the technical solutions of the present disclosure, not to limit it. Although the present disclosure has been described in detail with reference to the above-mentioned embodiments, those skilled in the art should understand that the technical solutions recorded in the above-mentioned embodiments may still be amended, or some or all of the technical features thereof may be replaced equivalently. However, the amendments or replacements do not make the essence of the corresponding technical solutions separate from the scope of the technical solutions according to the embodiments of the present disclosure.

What is claimed is:

1. An editable read-write data memory based on mechanical structure, comprising: a storage unit, a signal collection unit (7) and a cantilever unit (10);

wherein the data memory is formed by arranging a plurality of storage units, and each of the plurality of storage units includes a rotation unit (1) and a variable-frequency unit (4); the rotation unit (1) is provided with two N-pole magnets (2) at a left side and a right side, respectively, and an S-pole probe (11) is provided at the cantilever unit (10); when the S-pole probe (11) at the cantilever unit (10) approaches at least one of the N-pole magnets (2) at the rotating unit driven by change of external environment, the rotation unit (1) rotates to make one end of the rotation unit (1) tilt up; the variable-frequency unit (4) includes a left side plate, a right side plate and a middle flexible plate; a conductive copper sheet is provided at a right side of the middle flexible plate; when the two N-pole magnets (2) of the rotation unit (1) contact the S-pole probe (11), the variable-frequency unit (4) buckles and the middle flexible plate contacts the right side plate instead of the left side plate, and a change of a buckling shape leads to a state change, so as to store data; the signal collection unit (7) is connected to the variable-frequency unit (4) to display collected electrical signals, to achieve read function of information stored in the memory based on a change of output electrical signals.

2. The editable read-write data memory based on mechanical structure according to claim 1, wherein a state that the variable-frequency unit (4) contacts the left side plate is defined as a state "0", and a state that the variable-frequency unit (4) contacts the right side plate is defined as a state "1"; and the states "0" and "1" are not only two states of a single unit of a read-write memory, but also binary data that converts text, pictures, audio and other information into "0" and "1", thereby facilitating identifying and determining of a computer system.

3. The editable read-write data memory based on mechanical structure according to claim 2, wherein when the variable-frequency unit (4) contacts the right side plate instead of the left side plate, the conductive copper sheet (5) at the right side of the variable-frequency unit (4) contacts the right side plate to generate electrical signals, and a wire (6) transmits the electrical signals to the signal collection unit (7).

4. The editable read-write data memory based on mechanical structure according to claim 1, wherein the magnet probe (11) rotates 360° by the cantilever unit (10) so as to be capable of contacting each of the storage units in a layer.

5. The editable read-write data memory based on mechanical structure according to claim 1, wherein the cantilever unit (10) slides up and down vertically by a guide rail (9) so that the magnet probe (11) is capable of contacting each of the storage units in different layers.

6. The editable read-write data memory based on mechanical structure according to claim 1, wherein the rotation unit (1) rotates around a rotation shaft (13) provided at a center of the rotation unit (1), the rotation shaft (13) is fixed and penetrates through the rotation unit (1), the two N-pole magnets (2) are symmetrically provided at both sides of the rotation shaft (13), and when the S-pole probe (11) contacts the at least one of the N-pole magnets (2), the two N-pole magnets (2) are capable of rotating up and down through the rotation shaft (13).

7. The editable read-write data memory based on mechanical structure according to claim 1, wherein the storage unit is capable of being expanded into a three-dimensional memory of n×n×n to obtain more stored information.

\* \* \* \* \*